United States Patent [19]

Ray et al.

[11] Patent Number: 4,631,325
[45] Date of Patent: Dec. 23, 1986

[54] ACCELERATOR COMBINATIONS FOR ANAEROBIC POLYMERIZATION

[75] Inventors: John R. Ray, Allison Park, Pa.; Michael A. Williamson, Washington, D.C.; James D. B. Smith, Monroeville, Pa.

[73] Assignee: Westinghouse Electric Corp., Pittsburgh, Pa.

[21] Appl. No.: 755,118

[22] Filed: Jul. 15, 1985

[51] Int. Cl.$^4$ .................... C08F 4/00; C08F 4/40; C08F 20/20

[52] U.S. Cl. .................. 526/220; 526/323.1; 526/323.2

[58] Field of Search .............. 526/220, 323.1, 323.2

[56] References Cited

U.S. PATENT DOCUMENTS

| | | | |
|---|---|---|---|
| 3,985,943 | 10/1976 | Gruber et al. | 526/328 |
| 4,146,588 | 3/1979 | Sunamori et al. | 526/220 |
| 4,160,178 | 7/1979 | Smith et al. | 310/43 |
| 4,239,802 | 12/1980 | Smith et al. | 428/377 |
| 4,316,000 | 2/1982 | Boeder | 526/301 |
| 4,442,138 | 4/1984 | Bich et al. | 427/116 |
| 4,546,125 | 10/1985 | Okamoto et al. | 526/323.2 |

OTHER PUBLICATIONS

W. E. Byrd, "Amine-Sulfur Dioxide Complexes, Solid-Liquid-Gas Equilibria and Infrared Spectra of Complexes with N,N-Dimethylanilines", *Inorg. Chem.*, vol. 1, pp. 762-768, Nov. 1962.

*Primary Examiner*—Harry Wong, Jr.
*Attorney, Agent, or Firm*—Daniel P. Cillo

[57] ABSTRACT

A curable resinous composition is made comprising an anaerobically polymerizable liquid material, and a curing agent comprising: a complex of a free radical initiator, and an accelerator, said accelerator comprising a complex of a tertiary amine and sulfur dioxide.

10 Claims, No Drawings

ACCELERATOR COMBINATIONS FOR ANAEROBIC POLYMERIZATION

BACKGROUND OF THE INVENTION

Anaerobic resins, those which will not cure in the presence of oxygen, but will cure in the presence of nitrogen or other inert gas, i.e., upon exclusion of oxygen, are well known in the art. Such resins generally contain: polyacrylics, such as diacrylates or triacrylates which polymerize by addition through a double bond; optional vinyl material or epoxy resin; an accelerator, usually a tertiary amine, for example, a N,N'-dialkylarylamine, such as N,N'-dimethyl-p-toluidine or N,N'-diethyl-p-toluidine; a coaccelerator, usually an organic sulfimide such as benzoic sulfimide; a free radical initiator, such as cumene hydroperoxide or t-butyl perbenzoate; and a stabilizer for the initiator, such as hydroquinone.

Smith et al., in U.S. Pat. Nos. 4,160,178 and 4,239,802, and Bich et al., in U.S. Pat. Nos. 4,442,138, utilized acrylic resin-vinyl monomer anaerobic type systems, catalyzed with cumene hydroperoxide, and cure accelerated with a combination of N,N'-dimethyl-p-toluidine and benzoic sulfimide. Both of these Smith at al. patents, as well as the Bich et al. patent, give a detailed description of anaerobic cure chemistry and the wide variety of useful monomers and other resin components, and reference may be made to them for such details.

It has been found that N,N'-dialkylarylamines, such an N,N'-dimethyl-p-toluidine and N,N'-diethyl-p-toluidine are among the few amine accelerators that give completely hard cured resins in flowing nitrogen. However, in using these accelerators, cure reactivity is reduced, causing longer resin gel times. Substituting basic aliphatic amides for the N,N'-dialkylarylamines, provides good gel activity but results in softer cured resins, lacking in tensile strength properties. It has also been found that organic sulfimides additionally help to limit reactivity and can cause phase separations and other solubility problems.

Others have tried different combinations of accelerators for anaerobic compositions, for example, Gruber et al. in U.S. Pat. No. 3,985,943 used disulfonamides aong with N,N'-dimethyl-p-toluidine or tri-n-butylamine, and Boeder, in U.S. Pat. No. 4,316,000 used a perfluoroalkyl sulfonanilide along with N,N'-dimethyl-p-toluidine. Although these teachings provide various good bonding and fast gel characteristics, what is needed are additional, improved, co-reactive materials specifically for tertiary amine accelerators in an anaerobic system, which will provide fast gel times as well as a hard cure.

SUMMARY OF THE INVENTION

We have found that a complex of interacted tertiary amine and sulfur dioxide provides an outstanding accelerator system for anaerobically polymerizable prepolymers, particularly liquid insulating materials, eliminating the need for organic sulfimide coaccelerator. This accelerator complex provides both fast gel times and a hard cure for the anaerobic composition, when used in conjunction with a free radical initiator. These complexes have been made and their decomposition controlled so as to be useful in anaerobically curable systems, usually containing acrylic material.

The resinous system, containing anaerobically polymerizable liquid; free radial initiator; and tertiary amine-$SO_2$ complex, can be applied to an electrically conducting article in the presence of oxygen, and then the article can be placed in a gaseous atmosphere which does not contain oxygen, to cure the resin. The complexes were formed, in one embodiment, by bubbling $SO_2$ gas through a solution of N,N'-dimethyl-p-toluidine in hexane solvent to form crystals which were quick filtered and redissolved in hexane. Bubbling $SO_2$ gas through this second solution provided purified crystals of complexed N,N'-dimethyl-p-toluidine and sulfur dioxide.

This tertiary amine-sulfur dioxide accelerator complex forms an additional complex with free radical initiators used to catalyze polymerization under anaerobic conditions. Upon oxygen displacement, the accelerator-initiator complex splits up, initiating anaerobic cure. Preferred free radical initiators are organic peroxides. Preferred tertiary amines for the accelerator complex are tertiary N,N'-alkylarylamines.

DESCRIPTION OF THE PREFERRED EMBODIMENTS

The anaerobically polymerizable prepolymers of this invention are preferably liquid compositions that contain aliphatic polyacrylates, and optionally reactive vinyl monomers, aliphatic monoacrylics, and epoxy resins. The polyacrylics that are particularly useful in the anaerobic resinous composition of this invention are selected from the group of aliphatic, organic diacrylates such as, for example, tetraethylene glycol dimethacrylate, tetraethylene glycol diacrylate, hexamethylene glycol dimethacrylate, neopentyl glycol diacrylate, neopentyl glycol dimethacrylate, hexamethylene glycol diacrylate, ethylene glycol dimethacrylate, trimethylene glycol diacrylate, bisphenol A dimethacrylate, their mixtures, and the like; and aliphatic organic triacrylates such as, for example, trimethylol propane triacrylate, and the like, and mixtures of these types of diacrylates and triacrylates. The preferred polyacrylate is tetraethylene glycol dimethacrylate.

Useful optional vinyl monomers are organic, aromatic, reactive vinyl monomers, such as vinyl pyridine, vinyl toluene, tertiary butyl styrene, styrene, and the like. Useful optional organic, aliphatic monoacrylics are ethyl acrylate, 2-ethyl acrylate, 2-ethylhexyl acrylate, ethyl methacrylate, glycidyl methacrylate, allylmethacrylate, and the like, and vinyl acids such as acrylic acid, methacrylic acid, and the like. Both of these types of materials can act as reactants and diluents for the polyacrylates, and the epoxy if it is used.

Useful optional epoxy resins include diglycidyl ethers of bisphenol A, diglycidyl ethers of bisphenol F, polyglycidyl ethers of a novolac, glycidyl ester epoxy resins, cycloaliphatic epoxy resins, hydantoin epoxy resins, diglycidyl ethers of an aliphatic diol, and the like. When epoxy resins are used, organic, carboxylic acid anhydrides reactive with the epoxy can be included, for example, hexahydrophthalic anhydride, tetrahydrophthalic anhydride, phthalic anhydride, pyromellitic dianhydride, and the like. Useful weight ratios of the preferred anaerobically polymerizable resin component, of aliphatic, poly (di or tri) acrylic:aliphatic monoacrylic:aromatic reactive vinyl monomer:epoxy resin:anhydride are from about 10:0 to 20:0 to 120:0 to 60. Of course any other liquid resin composition polymerizable by anaerobic means, i.e., displacement of oxygen, can be used with the accelerator of this invention.

Usually, the anaerobic insulating resin of this invention will have an effective amount of initiator and accelerator, and optional amounts of free radical stabilizer and latent catalyst. These amounts per 100 parts by weight of the described anaerobically polymerizable resin component are: about 0.001 to 10 parts of an organic free radical initiator; about 0.01 to 20 parts of the accelerator complex of this invention; 0 to about 1 part, preferably from about 0.001 to 1 part of a free radical stabilizer; and 0 to about 5 parts of a latent catalyst.

Free radical reaction initiators particularly useful in the composition of this invention are, preferably, effective amounts of organic peroxides, such as, for example, cumene hydroperoxide, t-butyl perbenzoate, t-butyl hydroperoxide, benzoyl peroxide, 2,5-dimethyl-2,5bis(-benzoylperoxy)hexane, and the like, with hydroperoxides preferred. The free radical initiator must be present in an amount effective to provide sufficient free radicals, upon split up of the double complex between the free radical initiator and the tertiary amine-$SO_2$ complex, to initiate polymerization by adding to the acrylic or vinyl monomer. A more detailed description of organic peroxides will follow.

Free radical stabilizers, used to stabilize the initiator, which may also be used in the resin of this invention are effective amounts of organic reaction inhibitors such as, for example, hydroquinone, parabenzoquinone, aromatic acidic phenolic compounds such as di-nitrophenols, tri-nitrophenols and picric acid, and the like.

In some instances, latent catalysts may also be used for improving the electrical properties of these resins. These latent catalysts are well known in the art and include organic quaternary ammonium salts, organic quaternary phosphonium salts, and quaternary organo-tin compounds, among others. Examples of some useful latent catalysts would include, for example, trimethyl ammonium chloride, methyltrioctyl phosphonium dimethyl phosphate, triphenyl tin acetate, and the like. The polymerizable liquid can also contain minor amounts of thixotropic agent, such as fumed silica, and up to 100 parts by weight per 100 parts of polymerizable liquid of filler particles such as alumina, alumina trihydrate, and the like, of average particle size of from about 10 microns to about 300 microns.

The useful tertiary amines that will interact and form a complex with sulfur dioxide have the structural formula:

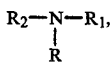 (I)

where R can be selected from aryl; alkylaryl, i.e., alkyl substituted aryl, where the alkyl is attached to the aryl ring and the aryl ring is next to N, and where alkyl=$CH_3$, $C_2H_5$, or $C_3H_7$; biphenyl, i.e.,

alkyl substituted biphenyl where the phenyl ring is next to N, and where alkyl=$CH_3$, $C_2H_5$, or $C_3H_7$; aryl alkyl aryl, i.e.,

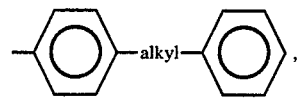

where alkyl=$CH_3$, $C_2H_5$, or $C_3H_7$; alkyl substituted aryl alkyl aryl, where the alkyl is attached to one or both of the aryl rings, and where alkyl=$CH_3$, $C_2H_5$, or $C_3H_7$; naphthyl, i.e.,

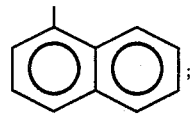

alkyl substituted naphthyl, where alkyl=$CH_3$, $C_2H_5$, or $C_3H_7$; and

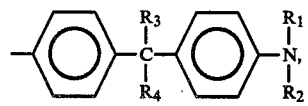

which provides a tertiary alkyl aryl diamine, herein considered a tertiary amine, where $R_1$ and $R_2$ are defined below, where $R_3$ can be selected from H, $CH_3$, $C_2H_5$, or $C_3H_7$, and where $R_4$ can be selected from H, $CH_3$, $C_2H_5$, or $C_3H_7$; $R_1$ and $R_2$ for the formula (I) and for the diamine above can each be independently selected from $CH_3$, $C_2H_5$; $C_3H_7$; aryl; alkylaryl, i.e., alkyl substituted aryl, where the alkyl is attached to the aryl ring and the aryl ring is next to N, and where alkyl=$CH_3$, $C_2H_5$, or $C_3H_7$; and aryl alkyl, i.e., -alkylaryl, where alkyl=$CH_3$, $C_2H_5$, or $C_3H_7$.

Most preferred tertiary amines are tertiary N,N'-alkylarylamines, the most preferred of which have the structural formula:

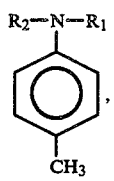 (II)

where $R_1$=$CH_3$ or $C_2H_5$; and $R_2$=$CH_3$ or $C_2H_5$, for example N,N'-dimethyl-p-toluidine, N,N'-diethyl-p-toluidine and their mixtures. Completely aliphatic tertiary amines would tend to be very reactive, and could form complexes between $SO_2$ and the free radical initiator that would be very slow to decompose upon oxygen displacement. $R_1$ and $R_2$ should be low carbon alkyl chains alone or with aryl groups so as not to interfere with complex formation. $R_1$, $R_2$ and R in formula (I) should provide an inductive effect, increasing the electron density on the N atom. R in formula (I) should have a ring structure bonded to N so as to not provide too basic an amine which would tend to form very stable complexes with $SO_2$.

Upon interaction of sulfur dioxide and the tertiary amine, such as bubbling dry $SO_2$ gas through a nonaqueous solvent solution of the tertiary amine, a complex between the two is formed, where a partial electron transfer is believed to occur between the nitrogen electron donor and sulfur electron acceptor. Using N,N'-dimethyl-p-toluidine as an example, the complex formed is believed to be a resonance hybrid structure of:

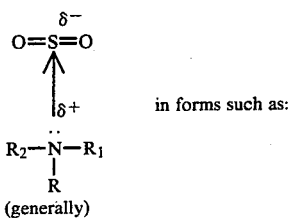

in forms such as:

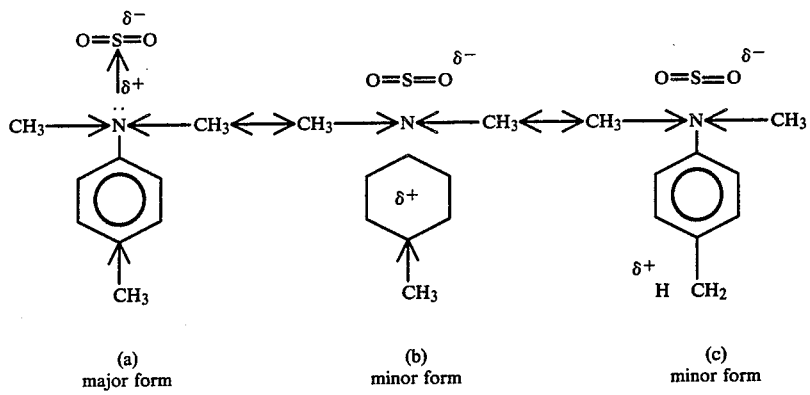

(a) major form  (b) minor form  (c) minor form

The arrows in the bonds indicate polarity, and δ⁻ or δ+ indicates partial charge.

In the 1:1 molar complex between the tertiary amine and SO₂ shown in formula (III)(a), the two electrons shown are not completely released by the nitrogen atom, so that there is partial electron transfer between nitrogen and sulfur. These tertiary amine-sulfur dioxide complexes are relatively stable if kept free of moisture in a sealed container. They are usually kept in a crystalline form. The accelerator, comprising the tertiary amine-SO₂ complex, must be present in an amount effective to form a somewhat stable double complex with the free radical initiator, helping inhibit free radical formation until displacement of oxygen. The basic reactions between tertiary amines and SO₂, to form complexes, are also described by W. E. Byrd in Inorg. Chem., Vol. 1, pp. 762-768, November 1962, which relates solely to forming such complexes.

These tertiary amine-SO₂ complexes also form additional complexes with free radical initiators such as organic peroxides. The peroxides will generally have the structural formula:

A—O—O—A          (IV)

where A can be selected from any organic radical that can attach to the —O—O— to form a peroxide, i.e, A can be H, or any combination of alkyl, aryl, and oxygen, including benzoyl, i.e.,

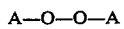
O—C—aryl, and acetyl, i.e.,

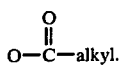
O—C—alkyl.

(III)

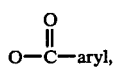

Preferably one A will equal H, to form a hydroperoxide. In one particularly useful peroxide, one A=H and the other A=dialkyl substituted aryl, for example cumene hydroperoxide. Organic hydroperoxides are the most preferred free radical initiators.

With an organic peroxide, such as, for example, cumene hydroperoxide, the double complex is thought to be:

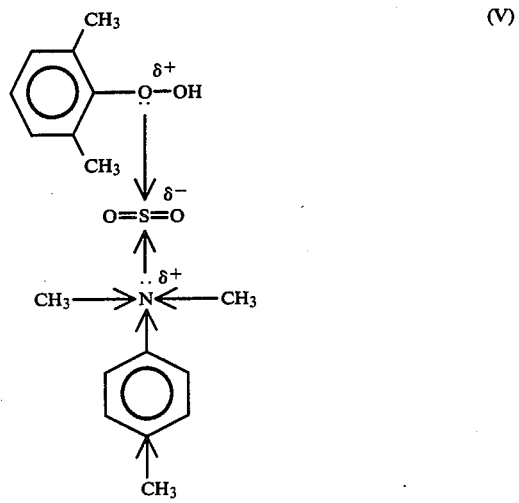

(V)

The sulfur of the amine-SO₂ complex interacts with one of the —O—O— oxygens of the peroxide, generally the oxygen between an A group and an OH group. While not shown, there may also be some hydrogen bonding between the H of the peroxide and the O of the sulfur dioxide. Again, there is only partial electron transfer as shown between oxygen and nitrogen to sulfur. This is a somewhat stable double complex which may not require an inhibitor for the free radical initiator, although one is generally used. It is not as stable as the single complex of structural formula (III). The dual complex (V) can be used as a curing agent for an acrylic solution. The peroxide should not generally be added directly to the tertiary amine-SO$_2$ complex due to possible violent reactions. However, if the tertiary amine-SO$_2$ complex is first formed and dissolved in an anaerobically polymerizable liquid, such as a mono or poly acrylic, or a vinyl liquid, then the peroxide can be added and will form the dual complex with the tertiary amine-SO$_2$ complex in the liquid carrier to be polymerized.

In the presence of O$_2$ dissolved in the resin acting as an inhibitor, the dual complex (V) will remain fairly stable. Upon displacement of O$_2$, the peroxide will decompose, to form free radicals, such as:

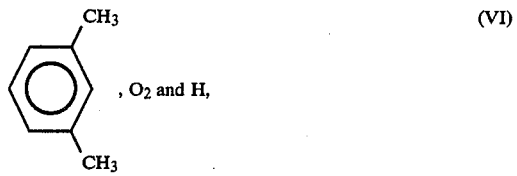

(VI)

This decomposition will cause a split between the sulfur dioxide component and the tertiary amine component of accelerator complex (III), all of which will additionally cause decomposition of the remaining dual complexes (V), causing more release of free radials from the organic peroxides, initiating polymerization of the polymerizable component. Thus, the tertiary amine-sulfur dioxide complex serves as a partial inhibitor for the initiator in the presence of O$_2$ dissolved in the resin, but when O$_2$ is displaced, serves to speed up the rate of decomposition of the other dual complexes allowing formation of free radicals which initiate polymeriztion by adding to the acrylic or aromatic vinyl monomer.

The anaerobic insulating resins of this invention can be formulated to have viscosities as low as 1 cps., making them uniquely applicable for coating and impregnation of multiple layered mica or glass insulated high voltage electrical conductors or coils. These resins can be formulated for use as wire enamel resins. These resins can also find particularly useful application as insulating potting resins for transformers and insulating casting resins for bushings which may be used in power circuit breakers, since they can be deep cured to 6 or more inches without requiring heat. Following cure by static, pressurized, or flowing non-O$_2$ diffusion gas, the resins can be optionally post-cured in an oven for up to 48 hours at from about 100° C. to 175° C. In most instances the electrical properties of the diffusion gas cured resins are more than adequate, and post-curing is not necessary, due to inert gas contact in a manner effective to displace oxygen dissolved in the resin, causing cure initiation.

Useful diffusion gases enabling oxygen displacing anaerobic cure, i.e., gases that are soluble in the resin and effective to permeate the resin and displace substantially all of the dissolved O$_2$ therein, are preferably, argon, helium, carbon dioxide, methane, hydrogen and nitrogen. By "displace" is meant removal of oxygen to a level below about 0.5 volume % i.e., below about 0.5 volume % O$_2$, the chain reaction cure will proceed between the combination of ingredients in the resin. Argon, helium and carbon dioxide are the most effective to displace O$_2$, but nitrogen is preferred because it is commercially available in pure form free of moisture. Of course, other gases or gas mixtures effective to act as defined above can be used.

Although the anaerobic reaction mechanism is not completely understood at this time, it is thought that the O$_2$ dissolved in the resin acts as a reaction inhibitor to the peroxide initiator. When a non-oxygen containing gas, which is soluble in the resin, and which is capable of permeating the resin and by some means displacing and forcing the dissolved O$_2$ from the resin, is passed over the resin or pressure forced into the resin, then the anaerobic cure mechanism typified by this invention can proceed.

EXAMPLE

A tertiary N,N'-alkarylamine-sulfur dioxide complex was first formed: 200 grams of dried, solid N,N'-dimethyl-p-toluidine (NN DmpT) was dissolved in a reaction flask with about ½ liter of hexane solvent, to form a reddish colored solution. Then, Matheson reagent grade, anhydrous SO$_2$ gas was bubbled through the solution at a rate of about 10 liters/minute at 5° C. The SO$_2$ had previously been passed through concentrated sulfuric acid to remove any moisture present in the SO$_2$.

Introduction of a molar excess of the SO$_2$ led to the formation of precipitated orange crystals in the reddish hexane solution. The SO$_2$ bubbling was discontinued and crystals were removed by a quick filtration onto a cold Buchner funnel. The crystals were then redissolved in a second container of hexane solvent, providing a yellow-orange colored solution. Additional SO$_2$ gas was bubbled through the second solution leading to the formation of precipitated yellow-orange crystal needles in an orange solution. The second crystal formation was believed to be a more concentrated, purified crystalline form of a NN DmpT-SO$_2$ complex. These crystals were then filtered and stored. These crystals, if protected from moisture, could be stored in a stoppered container at room temperature without apparent decomposition. The solutions were examined in a 0.03 mm path length cell fitted with potassium bromide (KBr) windows. These KBr windows permit infrared spectra to be obtained over the region 4000 cm$^{-1}$ to 300 cm$^{-1}$. Spectra were also obtained on capillary films of the crystalline compounds and solutions using KBr or cesium iodide (CsI) discs. Spectra on solid crystals were obtained by dispersing the solid in KBr powder which was then pressed into a disc.

The spectra were obtained on either a Beckman model IR-12 infrared spectrophotometer, which has a range of 4000 cm$^{-1}$ to 200 cm$^{-1}$, or a Diglab model FTS-14 Fourier-transform spectrophotometer, which has a range from 3800 cm$^{-1}$ to 400 cm$^{-1}$. Both instruments were capable of resolution of 0.5 cm$^{-1}$.

The infrared spectrum of SO$_2$ has been examined in three states in the art, and its primary bands have been assigned:

| State of SO$_2$ | $v$ sym | $v$ asym | $v$ |
|---|---|---|---|
| Gas | 1151 cm$^{-1}$ | 1362 cm$^{-1}$ | 518 cm$^{-1}$ |
| Liquid (−180° C.) | 1147 cm$^{-1}$ | 1130 cm$^{-1}$ | 521 cm$^{-1}$ |
| Solution (CCl$_4$) | 1149 cm$^{-1}$ | 1346 cm$^{-1}$ | |

These bands would not be expected to remain in the same location if SO$_2$ formed a complex. In fact, if they did not shift, there would be reason to suspect that a complex has not formed. The crystals formed by action of $SO_2$ on NN DmpT provided bands at $\nu sym=1120$ cm$^{-1}$, $\nu asym=1280$ cm$^{-1}$, and $\nu=530$ cm$^{-1}$. These shifts, along with color changes described, indicate that a NN DmpT-$SO_2$ complex was formed and the fact that all primary frequencies are affected in this bond formation tends to indicate the formation of a strong bond between the S of the $SO_2$ and the N of the amine.

An anaerobic composition was then made from: 175 grams of neopentylglycol diacrylate; 50 grams of tri methylol propane triacrylate; 25 grams of ethylmethacrylate; 50 grams of styrene; 25 grams of a liquid diglycidyl ether of bisphenol A epoxy resin, having a viscosity of 25° C. of from about 8,000 cps. to 10,000 cps. (sold commercially by Dow Chemical Co. under the Trade Name DER 828); 10 grams of cumene hydroperoxide free radical initiator; 2.75 grams of the yellow-orange crystals of the N,N'-dimethyl-p-toluidine-$SO_2$ accelerator complex formed above; and 0.4 gram of hydroquinone inhibitor, with the peroxide being added last. The weight ratio of polyacrylic monomer:monoacrylic monomer was 1:0.06. The weight ratio of acrylic monomer:aromatic reactive vinyl monomer:epoxy resin was 1:0.12:0.06. The parts additive per 100 parts resin (acrylic+styrene+epoxy) were: 2 parts organic free radical initiator; 0.55 part NN DmpT-$SO_2$ accelerator complex, and 0.08 part free radical stabilizer. The viscosity of the resin was about 100 cps at 25° C. Before addition of peroxide, the acrylate-accelerator liquid had a yellow-orange color. After addition of the peroxide, the liquid has a visible color change to pale yellow, indicating accelerator-peroxide complex formation. Under most circumstances the tertiary amine-$SO_2$ accelerator should not be mixed solely with the peroxide, but should be allowed to form a curing agent complex by addition to the acrylate accelerator liquid.

Ten gram samples of the anaerobic composition, containing acrylic, styrene, epoxy, peroxide, tertiary amine-$SO_2$ complex, and inhibitor, were poured into aluminum dishes, which were placed in small glass desiccators with a nitrogen gas inlet and an exit. Nitrogen was then fed into the desiccator at 25° C. at a rate of about 10 liters/minute, forcing $O_2$ from the desiccator and the sample material. Under these conditions the samples gelled in 3 hours and completely cured to hard resinous materials after 16 hours.

Observation of the samples after 16 hours of $N_2$ flow, showed a hard, colorless acrylic resin coating that was evenly and completely cured, showing no odor of acrylate. The lack of color would indicate the double complex had disassociated. Thus, the N,N'-dimethyl-p-toluidine—$SO_2$ complex shown to be formed, acted as an excellent accelerator in conjunction with a peroxide initiator.

We claim:
1. A curable composition comprising:
 (A) an anaerobically polymerizable prepolymer containing acrylic material; and
 (B) a complex of free radical initiator and accelerator, said accelerator comprising a complex of tertiary amine containing at least one aryl ring structure, and sulfur dioxide.
2. The curable composition of claim 1, where the composition also contains an effective amount of free radical stabilizer for the initiator.
3. The curable composition of claim 1, where the anaerobically polymerizable prepolymer comprises polyacrylic material.
4. The curable composition of claim 1, where the tertiary amine is a tertiary N,N'-alkylarylamine.
5. The curable composition of claim 1, where the free radical initiator is an organic peroxide.
6. The curable composition of claim 1, where (A) comprises polyacrylic material, the initiator is an organic peroxide, the tertiary amine is selected from the group consisting of N,N'-dimethyl-p-toluidine, N,N'-diethyl-p-toluidine, and mixtures thereof, and the accelerator complex is a 1:1 molar complex of tertiary amine and sulfur dioxide.
7. The curable composition of claim 5, where the anaerobically polymerizable prepolymer comprises acrylic material selected from the group consisting of aliphatic organic diacrylates, aliphatic organic triacrylates, and mixtures thereof.
8. The curable composition of claim 1, where the ring structure of the tertiary amine is bonded to nitrogen in the amine.
9. The curable composition of claim 1, where the tertiary amine has the structural formula:

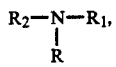

where R is selected from the group consisting of aryl and alkylaryl where aryl is next to N and where alkyl is selected from the group consisting of $CH_3$, $C_2H_5$ and $C_3H_7$; and $R_1$ and $R_2$ are each selected from the group consisting of $CH_3$, $C_2H_5$, $C_3H_7$, aryl, alkylaryl where aryl is next to N and where alkyl is selected from the group consisting of $CH_3$, $C_2H_5$ and $C_3H_7$ and aryl alkyl, where alkyl is selected from the group consisting of $CH_3$, $C_2H_5$ and $C_3H_7$.
10. The curable composition of claim 1, where the tertiary amine has the structural formula:

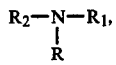

where $R_1$ and $R_2$ are each independently selected from the group consisting of $CH_3$; $C_2H_5$; $C_3H_7$; aryl; alkylaryl where the alkyl is attached to the aryl ring and the aryl ring is next to N, and where alkyl is selected from the group consisting of $CH_3$, $C_2H_5$, and $C_3H_7$; and aryl alkyl where alkyl is selected from the group consisting of $CH_3$, $C_2H_5$, and $C_3H_7$; and where R is selected from the group consisting of aryl; alkylaryl where the alkyl is attached to the aryl ring and the aryl ring is next to N, and where alkyl is selected from the group consisting of $CH_3$, $C_2H_5$, and $C_3H_7$; biphenyl; alkyl substituted biphenyl where the phenyl ring is next to N, and where alkyl is selected from the group consisting of $CH_3$, $C_2H_5$, and $C_3H_7$; aryl alkyl aryl, where alkyl is selected from the group consisting of $CH_3$, $C_2H_5$, and $C_3H_7$; alkyl substituted aryl alkyl aryl where the alkyl is attached to one or both of the aryl rings, and where alkyl is selected from the group consisting of $CH_3$, $C_2H_5$, and $C_3H_7$; naphthyl; alkyl substituted naphthyl, where alkyl is selected from the group consisting of $CH_3$, $C_2H_5$, and $C_3H_7$; and

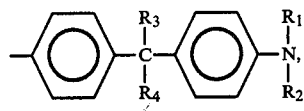

where $R_1$ and $R_2$ are defined above, where $R_3$ is selected from the group consisting of H, $CH_3$, $C_2H_5$, and $C_3H_7$, and where $R_4$ is selected from the group consisting of H, $CH_3$, $C_2H_5$, and $C_3H_7$.

* * * * *